United States Patent
Ren et al.

(10) Patent No.: US 10,484,842 B2
(45) Date of Patent: Nov. 19, 2019

(54) COMMUNICATION SYSTEM

(71) Applicant: RUUUUN CO., LTD., Shenzhen (CN)

(72) Inventors: Baogang Ren, Shenzhen (CN);
Yonghua Huang, Shenzhen (CN)

(*) Notice: Subject to any disclaimer, the term of this patent is extended or adjusted under 35 U.S.C. 154(b) by 232 days.

(21) Appl. No.: 15/675,020

(22) Filed: Aug. 11, 2017

(65) Prior Publication Data

US 2017/0339537 A1   Nov. 23, 2017

Related U.S. Application Data

(63) Continuation of application No. PCT/CN2016/071967, filed on Jan. 25, 2016.

(30) Foreign Application Priority Data

Feb. 11, 2015   (CN) .......................... 2015 1 0073396

(51) Int. Cl.
| | | |
|---|---|---|
| G06F 15/16 | (2006.01) | |
| H04W 4/12 | (2009.01) | |
| H04L 29/12 | (2006.01) | |
| G06F 1/16 | (2006.01) | |
| H04L 29/08 | (2006.01) | |

(52) U.S. Cl.
CPC .............. *H04W 4/12* (2013.01); *G06F 1/163* (2013.01); *H04L 29/1216* (2013.01); *H04L 29/08072* (2013.01)

(58) Field of Classification Search
CPC ........................ H04L 29/08072; H04L 29/06
USPC ........................ 709/220, 224, 226, 228, 232
See application file for complete search history.

(56) References Cited

U.S. PATENT DOCUMENTS

| | | | |
|---|---|---|---|
| 8,521,155 B2* | 8/2013 | Wormald | H04L 29/1216 370/352 |
| 9,495,456 B2* | 11/2016 | Petersen | H04L 67/10 |
| 9,639,522 B2* | 5/2017 | Dogrultan | G06F 17/24 |
| 2004/0078424 A1* | 4/2004 | Yairi | H04L 51/04 709/203 |
| 2005/0027742 A1* | 2/2005 | Eichstaedt | G06F 9/542 |
| 2006/0195565 A1* | 8/2006 | De-Poorter | H04L 29/12009 709/224 |
| 2009/0163201 A1* | 6/2009 | Wormald | H04L 29/1216 455/426.2 |

(Continued)

FOREIGN PATENT DOCUMENTS

| | | |
|---|---|---|
| CN | 103472914 A | 12/2013 |
| CN | 104320406 A | 1/2015 |
| CN | 104660494 A | 5/2015 |

*Primary Examiner* — Khanh Q Dinh
(74) *Attorney, Agent, or Firm* — Erson IP (Nelson IP)

(57) ABSTRACT

A communication system is provided which comprises a mobile terminal and a wearable device connected wirelessly to each other. The mobile terminal comprises a first communication module and an auxiliary module comprising an instant messaging unit and an information processing unit connected to the instant messaging unit and the first communication module respectively. The wearable device comprises a second communication module, an input module, an output module and a control module respectively connected to the second communication module, the input module and the output module. The embodiments of the present invention can realize instant messaging, reduce the volume, hardware requirement and the cost of the wearable device, and extend a stand-by time of the wearable device.

8 Claims, 3 Drawing Sheets

(56) References Cited

U.S. PATENT DOCUMENTS

| | | | |
|---|---|---|---|
| 2013/0346545 A1* | 12/2013 | Petersen | H04L 67/10 709/217 |
| 2014/0359018 A1 | 12/2014 | Sun | |
| 2015/0163182 A1* | 6/2015 | Chandrasekaran | H04L 51/063 709/204 |
| 2015/0244848 A1* | 8/2015 | Park | G06F 3/017 455/412.2 |
| 2016/0179855 A1* | 6/2016 | Roman | H04L 63/08 707/744 |

* cited by examiner

COMMUNICATION SYSTEM

CROSS-REFERENCE TO RELATED APPLICATIONS

This application is a continuation of International Patent Application No. PCT/CN2016/071967 with a filing date of Jan. 25, 2016, designating the United States, now pending, and further claims priority to Chinese Patent Application No. 201510073396.7 with a filing date of Feb. 11, 2015. The content of the aforementioned applications, including any intervening amendments thereto, are incorporated herein by reference.

TECHNICAL FIELD

The present invention relates to the field of communication technology, and more particularly to a communication system.

BACKGROUND OF THE PRESENT INVENTION

With the feature of lightweight and close fitting to the body, wearable devices have become an important carrier of communication between the human body and the world. Wearable device is a general name of devices which are wearable and intelligently designed as well as developed from daily wearing with wearable technology. Generalized wearable devices involve two categories:

(1) the one such as smart watches, smart glasses, etc., which is full-featured, larger in size, and may realize complete or part of the communication functions without relying on mobile terminals, such as mobile phones etc.; and (2) those such as smart bracelets, etc., which only focus on a certain type of application functions, and need to cooperate with mobile terminals with mobile communication capabilities.

Instant messaging application has become an indispensable tool for mobile terminal users. When using the instant messaging applications, the following functions are most commonly used: writing and transmitting text information (including various expressions) to friends, receiving and reading the text information of friends, transmitting multimedia information (including pictures, animations, videos, music, files, etc.), and receiving and reading multimedia information from friends. The instant message includes not only voice and text, but also music, pictures (including GIF), animation, video, files and future information carrier. However, when using mobile terminals for instant message exchange, the user often encounters the following problems:

(1) It involves complicated operations for each transmitting and/or receiving of instant message: the user takes out the mobile terminal, unlocks the mobile terminal and enters the instant messaging application interface, and then transmits and/or receives the instant message via the operation interface provided by the instant massaging application;

(2) In some cases, such as in a crowded bus, due to the noisy environment, the user may not perceive the prompts of instant messaging applications, thus resulting in delay on checking information;

(3) In some cases, it is not convenient for the user to take out the mobile terminal to transmit and receive information.

At present, there are wearable devices that deal with these problems by wearing technology, for example running instant messaging applications on a watch. But it needs the instant messaging applications to be run directly on wearable devices, without relying on the mobile terminal to complete the instant messaging function. It is necessary for the wearing device to have a mobile communication capacity of 2G or more, an adequate storage space and memory, a battery with a larger capacity, a master chip with a computing capability sufficient to support the software system that instant messaging application relies on to operate independently. In that case, it will result in a higher cost of the wearable device, a shorter standby time, a larger size, and a higher hardware requirement for the wearable device.

SUMMARY OF PRESENT INVENTION

The embodiment of the present invention provides a communication system for realizing instant messaging and at the same time reducing the size, the hardware requirements and the cost of the wearable device, and extending the standby time of the wearable device.

A first aspect of the present invention discloses a communication system, comprising a mobile terminal and a wearable device wirelessly connected to each other; the mobile terminal comprises a first communication module and an auxiliary module comprising an instant messaging unit and an information processing unit connected with the instant messaging unit and the first communication module respectively; the wearable device comprises a second communication module, an input module, an output module and a control module respectively connected with the second communication module, the input module and the output module; the instant messaging unit is configured to establish a connection with a plurality of instant messaging servers during initialization; the instant messaging unit is further configured to receive an instant message provided by a target instant messaging server, obtain a first application identifier corresponding to the target instant messaging server according to types of the target instant messaging server, generate a receiving message according to the instant message and the first application identifier, and transmit the receiving message to the information processing unit; the instant message comprises a first message content and a first friend identifier; the receiving message comprises the first message content, the first application identifier and the first friend identifier; the target instant messaging server is any one of the plurality of instant messaging servers; the information processing unit is configured to transmit the receiving message to the first communication module; the first communication module is configured to transmit the receiving message to the second communication module; the second communication module is configured to transmit the receiving message to the control module; the control module is configured to transmit the receiving message to the output module; and the output module is configured to output the receiving message.

Referring to the first aspect of the present invention, as a first possible embodiment, the information processing unit is further configured to transmit a prompt message to the first communication module for indicating whether to receive the receiving message or not, after receiving the receiving message; the first communication module is further configured to transmit the prompt message to the second communication module; the second communication module is further configured to transmit the prompt message to the control module; the control module is further configured to transmit the prompt message to the output module; the output module is further configured to output the prompt message; the input module is further configured to receive a confirmation instruction inputted by a user according to the prompt message, and transmit the confirmation instruction to the control module; the control module is further configured to transmit the confirmation instruction to the second communication module; the second communication module is further configured to transmit the confirmation instruction to the first communication module; the first communication module is further configured to transmit the confirmation instruction to the information processing unit; and the information processing unit is further configured to execute a step of transmitting the receiving message to the first communication module, in response to the confirmation instruction.

Referring to the first aspect of the present invention, as a second possible embodiment, the input module is configured to receive a query information inputted by a user and transmit the query information to the control module; the query information includes a second application identifier and a second friend identifier; the control module is further configured to transmit the query information to the second communication module; the second communication module is further configured to transmit the query information to the first communication module; the first communication module is further configured to transmit the query information to the information processing unit; the information processing unit is further configured to find out whether there is a friend corresponding to the second friend identifier from a friend list included in the application corresponding to the second application identifier, and if so, the information processing unit transmits a confirmation information to the first communication module to confirm that there is a friend corresponding to the second friend identifier; the first communication module is further configured to transmit the confirmation information to the second communication module; the second communication module is further configured to transmit the confirmation information to the control module; the control module is further configured to transmit the confirmation information to the output module; the output module is further configured to output the confirmation information; the input module is further configured to receive the second message content inputted by the user and transmit the second message content to the control module; the control module is further configured to transmit the second message content to the second communication module; the second communication module is further configured to transmit the second message content to the first communication module; the first communication module is further configured to transmit the second message content to the information processing unit; the information processing unit is further configured to convert the second message content, the second application identifier, and the second friend identifier according to a first preset format and transmit to the instant messaging unit; and the instant messaging unit is further configured to transmit the converted second message content and the converted second friend identifier to the instant messaging server corresponding to the converted second application identifier so that the instant messaging server transmit the converted second message content to a friend corresponding to the converted second friend identifier; and the instant messaging server is any one of the plurality of instant messaging servers.

Referring to the first aspect of the present invention, as a third possible embodiment, the input module is configured to receive a sending message inputted by a user and transmit the sending message to the control module; the sending message includes a third message content, a third application identifier, and a third friend identifier; the control module is further configured to transmit the sending message to the second communication module; the second communication module is further configured to transmit the sending message to the first communication module; the first communication module is further configured to transmit the sending message to the information processing unit; the information processing unit is further configured to find out whether or not there is a friend corresponding to the third friend identifier from a friend list included in the application corresponding to third application identifier, and if so, the sending message is converted according to a second preset format and transmitted to the instant messaging unit; the instant messaging unit is further configured to transmit the converted third message content and the converted third friend identifier to the instant messaging server corresponding to the converted third application identifier so that the instant messaging server may transmit the converted third message content to the friend corresponding to the converted third friend identifier; and the instant messaging server is any one of the plurality of instant messaging servers.

Referring to the first aspect of the present invention, as a fourth possible embodiment, the information processing unit transmits the receiving message to the first communication module by way of: converting the receiving message according to a third preset format and then transmitting the converted receiving message to the first communication module.

Referring to the first aspect of the present invention, as a fifth possible embodiment, the mobile terminal further includes an instant messaging module connected to the instant messaging unit; the instant messaging unit, during initialization, establishes a connection with a plurality of instant messaging servers in such a manner that: the instant messaging unit establishes a connection with the plurality of instant messaging servers through the instant messaging module when the instant messaging unit is initialized; the instant messaging module is configured to establish a connection with the plurality of instant messaging servers during initialization; and the instant messaging module is further configured to receive the receiving message provided by the target instant messaging server and transmit the receiving message to the instant messaging unit; and the instant messaging unit receives the receiving message transmitted from the target instant messaging server in such a manner that: the instant messaging unit receives the receiving message provided by the target instant messaging server through the instant messaging module.

Referring to the first aspect of the present invention, as a sixth possible embodiment, the system further includes a transit server; the instant messaging unit, during initialization, establishes a connection with a plurality of instant messaging servers in such a manner that: the instant messaging unit establishes a connection with the plurality of instant messaging servers through the transit server during initialization; the transit server is configured to establish a connection with the plurality of instant messaging servers during initialization; and the transit server is further configured to receive the receiving message provided by the target instant messaging server and transmit the receiving message to the instant messaging unit; and the instant messaging unit receives the receiving message transmitted from the target instant messaging server in such a manner that: the instant messaging unit receives the receiving message provided by the target instant messaging server through the transit server.

Referring to the first aspect of the present invention, as a seventh possible embodiment, the instant messaging unit, during initialization, establishes a connection with a plurality of instant messaging servers by way of: transmitting an authorization request to the target instant messaging server to trigger the target instant messaging server to transmit a security identifier to the instant messaging unit; receiving a security identifier transmitted from the target instant messaging server to trigger the target mobile terminal to obtain the security identifier and transmit an authorization information including the security identifier and the application account logged in the target mobile terminal corresponding to the target instant messaging server, so as to trigger the target instant messaging server authorizes the instant messaging unit to log in via the application account; the target mobile terminal is a mobile terminal that has been authorized to conduct communication through the application account; and receiving a registration completion information transmitted from the target instant messaging server.

In the embodiments of the present invention, the wearable device may only need to be capable of communicating with the mobile terminal wirelessly and receiving information inputted by the user, and it is not necessary to have a communication capability of 2G or more. Therefore it realizes an instant messaging and at the same time reduces the size, hardware requirements and the cost of wearable device, and extends the standby time of wearable device.

DESCRIPTION OF THE DRAWINGS

In order to more clearly illustrate the technical solution in the embodiments of the present invention, the following drawings, which are intended to be used in the embodiments, are briefly described. Apparently, the drawings in the following description are merely exemplary embodiments of the present invention. Those skilled in the art will be able to obtain additional drawings in accordance with these drawings without paying any creative work.

DETAILED DESCRIPTION OF PREFERRED EMBODIMENTS

The technical solutions of the present invention will now be described clearly and completely with reference to the accompanying drawings in the embodiments of the present invention. Obviously, the described embodiments are merely some embodiments of the present invention and are not intended to be exhaustive. Under the teaching of these embodiments in the present invention, all other embodiments obtained by those of ordinary skill in the art without making creative work are within the protection scope of the present invention.

The embodiment of the present invention discloses a communication system for realizing instant messaging and at the same time reducing the size, the hardware requirements and the cost of the wearable device, and extending the standby time of the wearable device. The following is a detailed description.

Figure 1:
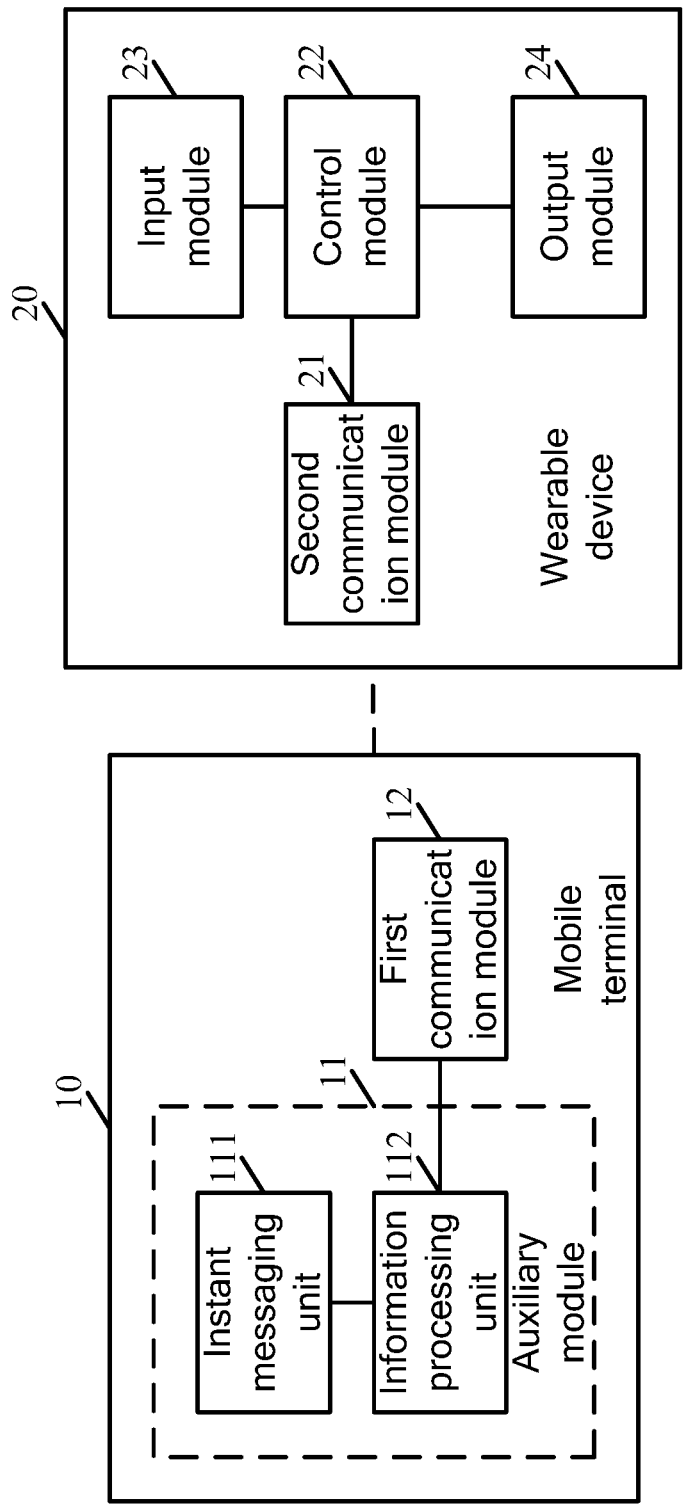
FIG. 1 is a block diagram of a communication system according to an embodiment of the present invention.

Referring to FIG. 1, FIG. 1 illustrates a block diagram of a communication system according to an embodiment of the present invention. As shown in FIG. 1, the communication system includes a mobile terminal 10 and a wearable device 20 connected with each other wirelessly. The mobile terminal 10 includes an auxiliary module 11 and a first communication module 12. The auxiliary module 11 includes an instant messaging unit 111 and an information processing unit 112. The information processing unit 112 is connected to the instant messaging unit 111 and the first communication module 12, respectively. The wearable device 20 includes a second communication module 21, a control module 22, an input module 23, and an output module 24, and the second communication module 21, the input module 23, and the output module 24 are connected to the control module 22, respectively.

Herein, the instant messaging unit 111 is configured to establish a connection with a plurality of instant messaging servers during an initialization process.

The instant messaging unit 111 is further used to receive an instant message transmitted from a target instant messaging server, obtain a first application identifier corresponding to the target instant messaging server according to the type of the target instant messaging server, generate a receiving message based on the instant message and the first application identifier, and transmit the receiving message to the information processing unit 112. The instant message includes a first message content and a first friend identifier, the receiving message includes the first message content, the first application identifier and the first friend identifier. The target instant messaging server may be any one of the plurality of instant messaging server.

The information processing unit 112 is configured to transmit the receiving message to the first communication module 12.

The first communication module 12 is configured to transmit the receiving message to the second communication module 21.

The second communication module 21 is configured to transmit the receiving message to the control module 22.

The control module 22 is configured to transmit the receiving message to the output module 24.

The output module 24 is configured to output the receiving message.

In the present embodiment, the mobile terminal 10 is connected to the wearable device 20 via a wireless connection, such as a Bluetooth connection, a Wi-Fi connection, a ZigBee connection, a radio frequency identification i.e., RFID connection, a modulation wireless transmission connection, an infrared connection, or the like. The mobile terminal 10 involves a mobile communication function, thus is available to transmit information to a server wirelessly, and the mobile terminal may be a mobile phone, a tablet, a notebook computer, a desktop computer, or the like.

In the present embodiment, when the communication system is initialized, a connection will be established between the instant messaging unit and a plurality of instant messaging servers. After the communication system is initialized, when the target instant messaging server receives the instant message to be transmitted to the mobile terminal, the target instant messaging server transmits the instant message to the instant messaging unit included in the mobile terminal, and the instant messaging unit then obtains the first application identifier corresponding to the target instant messaging server with the type of the target instant messaging server, generates the receiving message according to the instant message and the first application identifier, and then transmits the receiving message to the information processing unit. The information processing unit transmits the receiving message to the first communication module, the first communication module transmits the receiving message to the second communication module in the wearable device, the second communication module sends the receiving message to the control module, the control module transmits the receiving message to the output module, and the output module outputs the receiving message. Herein the instant message includes a first message content and a first friend identifier. The receiving message includes a first message content, a first application identifier and a first friend identifier. The target instant messaging server is any one of the plurality of instant messaging servers. The application corresponding to the first application identifier may be QQ, WeChat, MOMO, easychat, Laiwang, Tantan or other instant messaging applications, and may be any one of those instant messaging applications. A friend corresponding to the first friend identifier may be a friend in a friend list included in the application corresponding to the first application identifier, or may not the one in the friend list included in the application corresponding to the first application identifier, such as unfamiliar friends, friends obtained from nearby search and so on.

As a possible embodiment, the information processing unit transmits the receiving message to the first communication module in the following manner.

The receiving message is converted according to a preset format and transmitted to the first communication module.

In the present embodiment, when the format of the receiving message transmitted from the target instant messaging server is different from the format of the information that is able to be recognized and output by the wearable device. The information processing unit converts the format of the receiving message to the preset format that the wearing device can recognize and output, so that the wearable device can recognize and output the receiving message. Herein, the wearing device may output the receiving message in a voice mode through a microphone, a speaker or the like. The receiving message may also be output by a display screen through the text, animation, video, etc., or it may also be output through the combination of voice and display screen, and the present embodiment is not limited to those ways.

In the present embodiment, after the wearable device is started, it is also necessary to establish a wireless connection between the mobile terminal and the wearable device, which may be a connection request initiated by the mobile terminal to the wearable device, or may be a connection request transmitted from the wearable device to the mobile terminal. The present embodiment is not limited to these examples.

In the communication system described in FIG. 1, the wearable device may only need to be capable of communicating with the mobile terminal wirelessly and receiving information inputted by the user, and it is not necessary to have a communication capability of 2G or more. Therefore, it realizes an instant messaging and at the same time reduces the size, the hardware requirements and the cost of wearable device and extends the standby time of wearable device.

Figure 2:
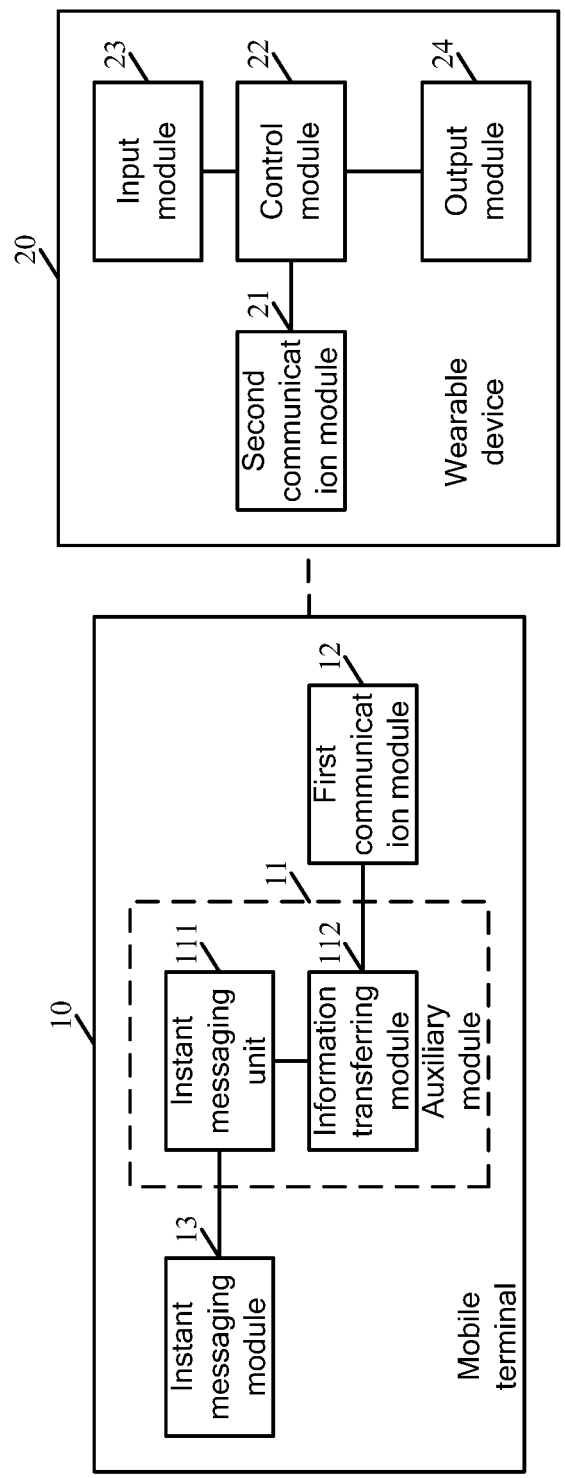
FIG. 2 is a block diagram of a communication system according to another embodiment of the present invention.

Referring to FIG. 2, FIG. 2 is a block diagram of another communication system according to another embodiment of the present invention. As shown in FIG. 2, the communication system includes a mobile terminal 10 and a wearable device 20 which are connected to each other with a wireless connection. The mobile terminal 10 includes an auxiliary module 11 and a first communication module 12. The auxiliary module 11 includes an instant messaging unit 111 and an information processing unit 112 respectively connected to the instant messaging unit 111 and the first communication module 12. The wearable device 20 includes a second communication module 21, a control module 22, an input module 23, and an output module 24. The second communication module 21, the input module 23, and the output module 24 are connected to the control module 22, respectively.

The instant messaging unit 111 is configured to establish a connection with a plurality of instant messaging servers during the initialization process.

The instant messaging unit 111 is further configured to receive the instant message transmitted from the target instant messaging server, obtain the first application identifier corresponding to the target instant messaging server according to the type of the target instant messaging server, generate the receiving message according to the instant message and the first application identifier, and transmit the receiving message to the information processing unit 112. The instant message includes a first message content and a first friend identifier. The receiving message includes the first message content, the first application identifier and the first friend identifier. The target instant messaging server may be any one of the plurality of the instant messaging servers.

The information processing unit 112 is configured to transmit the receiving message to the first communication module 12.

The first communication module 12 is configured to transmit the receiving message to the second communication module 21.

The second communication module 21 is configured to transmit the receiving message to the control module 22.

The control module 22 is configured to transmit the receiving message to the output module 24.

The output module 24 is configured to output the receiving message.

In the present embodiment, the mobile terminal 10 is connected to the wearable device 20 via a wireless connection such as a Bluetooth connection, a Wi-Fi connection, a ZigBee connection, a radio frequency identification, i.e. RFID connection, a modulation wireless transmission connection, an infrared connection, or the like. The mobile terminal 10 has a mobile communication capability, so as to transmit information to a server wirelessly, and the mobile terminal may be a mobile phone, a tablet, a notebook computer, a desktop computer, or the like.

In the present embodiment, when the communication system is initialized, the instant messaging unit will establish a connection with a plurality of instant messaging servers. After the communication system is initialized, when the target instant messaging server receives the instant message to be transmitted to the mobile terminal, the target instant messaging server transmits the instant message to the instant messaging unit included in the mobile terminal, and the instant messaging obtains first application identifier corresponding to the target the target instant messaging server according to the type of the target instant messaging server, generates the receiving message based on the instant message and the first application identifier, and then transmits the receiving message to the information processing unit. The information processing unit transmits the receiving message to the first communication module, and the first communication module transmits the receiving message to the second communication module included in the wearable device, the second communication module transmits the receiving message to the control module, the control module transmits the receiving message to the output module, and the output module outputs the receiving message. Herein the instant message includes a first message content and a first friend identifier. The receiving message includes a first message content, a first application identifier and a first friend identifier, and the target instant messaging server is any one of the plurality of instant messaging servers. The application corresponding to the first application identifier may be QQ, WeChat, MOMO, easyChat, Laiwang, Tantan or other instant messaging applications, and may be any one of those instant messaging applications. A friend corresponding to the first friend identifier may be a friend in a friend list included in the application corresponding to the first application identifier, or may not the one in the friend list included in the application corresponding to the first application identifier, such as unfamiliar friends, friends obtained from nearby search and so on.

As a possible embodiment, the mobile terminal also includes an instant messaging module 13 which connects with the instant messaging unit 111.

The instant messaging unit 111 establishes a connection with a plurality of instant messaging servers in the following manner during the initialization process.

During the initialization process, the instant messaging unit 111 establishes a connection with a plurality of instant messaging servers by the instant messaging module 13.

The instant messaging module 13 is configured to establish a connection with a plurality of instant messaging servers during the initialization process.

The instant messaging module 13 is further configured to receive the receiving message transmitted from the target instant messaging server and transmit the receiving message to the instant messaging unit 111.

The instant messaging unit 111 receives the receiving message transmitted from the target instant messaging server in the following manner.

The instant messaging unit 111 receives the receiving message transmitted from the target instant messaging server through the instant messaging module 13.

In the present embodiment, the number of the instant messaging module may be one, and the instant messaging module may establish a connection with a plurality of instant messaging servers, or there may be several instant messaging modules, and each of them may establish a connection with one instant messaging server.

In the present embodiment, during the communication system's initialization process, when the instant messaging server provides an interface for communicating with the instant messaging unit, the instant messaging unit may establish a connection directly with the plurality of instant messaging servers; when the instant messaging server does not provide any interface for communicating with the instant messaging unit, the instant messaging unit can establish a connection with a plurality of instant messaging servers through the instant messaging module so that the instant messaging unit can exchange information with the plurality of instant messaging servers through the instant messaging module.

As a possible embodiment, the information processing unit 112 is further configured to, after receiving the receiving message, transmit a prompt message to the first communication module 12 for indicating whether to receive the receiving message or not.

The first communication module 12 is further configured to transmit the prompt message to the second communication module 21.

The second communication module 21 is further configured to transmit the prompt message to the control module 22.

The control module 22 is further configured to transmit the prompt message to the output module 24.

The output module 24 is further configured to output the prompt message.

The input module 23 is configured to receive a confirmation instruction inputted by a user according to the prompt message, and transmit the confirmation instruction to the control module 22.

The control module 22 is further configured to transmit the confirmation instruction to the second communication module 21.

The second communication module 21 is further configured to transmit the confirmation instruction to the first communication module 12.

The first communication module 12 is further configured to transmit the confirmation instruction to the information processing unit 112.

The information processing unit 112 is further configured to execute a step of transmitting the receiving message to the first communication module 12, in response to the confirmation instruction.

In the present embodiment, after the mobile terminal receives the receiving message, the first message content, the first application identifier and the first friend identifier included in the receiving message may be transmitted to the wearable device by one trial. The user may be reminded by the wearable device that the receiving message is received. When a read instruction that the user input to read the receiving message has been received, the receiving message will get outputted. It is also possible to firstly transmit the wearable device a prompt message indicating whether to receive the receiving message or not, prompt message the prompt message is output to user through the wearable device, and when the confirmation instruction inputted by the user has been received, the confirmation instruction will be transmitted to the mobile terminal, the mobile terminal then transmits the receiving message to the wearable device, and the wearable device outputs the receiving message. Herein, the way of reminding the user can be vibration, voice, display lightening, LED lights flashing or combination thereof. The receiving message and prompt message can be outputted by the way of voice, text, animation, video and so on. Herein the first friend identifier is the identifier of the user who transmitted the receiving message.

As a possible embodiment, the input module 23 is configured to receive query information that the user inputs, and transmit it to the control module 22. The query information includes a second application identifier and a second friend identifier.

The control module 22 is further configured to transmit the query information to the second communication module 21.

The second communication module 21 is further configured to transmit the query information to the first communication module 12.

The first communication module 12 is further configured to transmit the query information to the information processing unit 112.

The information processing unit 112 is further configured to find out whether or not there is a friend corresponding to the second friend identifier from the friend list included in the application corresponding to the second application identifier, and if so, the information processing unit 112 transmits the confirmation information to the first communication module 12 to confirm that there is a friend corresponding to the second friend identifier.

The first communication module 12 is further configured to transmit the confirmation information to the second communication module 21.

The second communication module 21 is further configured to transmit the confirmation information to the control module 22.

The control module 22 is further configured to transmit the confirmation information to the output module 24.

The output module 24 is further configured to output the confirmation information.

The input module 23 is further configured to receive the second message content inputted by the user and transmitting it to the control module 22.

The control module 22 is further configured to transmit the second message content to the second communication module 21.

The second communication module 21 is further configured to transmit the second message content to the first communication module 12.

The first communication module 12 is further configured to transmit the second message content to the information processing unit 112.

The information processing unit 112 is configured to convert the second message content, the second application identifier and the second friend identifier into a first preset format and transmit them to the instant messaging unit 111.

The instant messaging unit 111 is further configured to transmit the converted second message content and the converted second friend identifier to the instant messaging server corresponding to the converted second application identifier so that the instant messaging server may transmit the converted second message content to the friend corresponding to the converted second friend identifier. The instant messaging server is any one of the plurality of instant messaging servers.

In the present embodiment, the communication system may not only transmit the receiving message received by the mobile terminal from the instant messaging server, to the wearable device, in which case the user can be informed by the wearable device of receiving the information, so that the user can receive the information through the wearable device, but also may transmit the information that the user needs to transmit to the mobile terminal by the wearable device, and the mobile terminal transmits the information to the corresponding instant messaging server.

In the present embodiment, when the user needs to transmit information through the wearable device, the user may firstly transmit an inquiry information including the second application identifier and the second friend identifier to the mobile terminal through the wearable device, and the mobile terminal finds out whether there is a friend corresponding to the second friend identifier in the friend list included in the application corresponding to the second application identifier, and if so, a confirmation information that there is a friend corresponding to the second friend identifier may be transmitted to the wearable device, so that the user may transmit the second message content to the mobile terminal via the wearable device, and the mobile terminal transmits the second message content and the second friend identifier to the instant messaging server corresponding to the second application identifier, and thus the instant messaging server may transmit the converted second message content to the friend corresponding to the converted second friends identifier. Herein when the format of the second message content, the second application identifier, and the second friend identifier entered by the wearable device is different from the first preset format corresponding to the instant messaging server corresponding to the second application identifier, before transmitting, the information processing unit included in the mobile terminal will firstly convert the second message content, the second application identifier, and the second friend identifier according to the first preset format.

In the present embodiment, if the friend list, included in the application corresponding to the second application identifier, does not include a friend corresponding to the second friend identifier, the mobile terminal transmits the wearable device a prompt message that there is no friend corresponding to the second friend identifier, so that the user may stop transmitting information to the friend corresponding to the second friend identifier, and may add a friend corresponding to the friend identifier into the application corresponding to the second application identifier, or reenter a correct second friend identifier.

In the present embodiment, when the communication system includes the communication module 13, the instant messaging unit 111 transmits the converted second message content and the converted second friend identifier to the instant messaging server corresponding to the converted second application identifier, so that the instant messaging server transmits the converted second message content to the friend corresponding to the converted second friend identifier, in the following detailed way. The instant messaging unit 111 transmits the converted second message content and the converted second friend identifier to the instant messaging server corresponding to the second application identifier via the communication module 13, so that the instant messaging server transmits the converted second message content to the friend corresponding to the converted second friend identifier, and the communication module 13 is further configured to receive the converted second message content from the instant messaging unit 111 and transmit the converted second message content and the converted second friend identifier to the instant messaging server corresponding to the converted second application identifier.

As a possible embodiment, the input module 23 is configured to receive the sending message inputted by the user and transmit the sending message to the control module 22. The sending message includes a third message content, a third application identifier, and a third friend identifier.

The control module 22 is further configured to transmit the sending message to the second communication module 21.

The second communication module 21 is further configured to transmit the sending message to the first communication module 12.

The first communication module 12 is further configured to transmit the sending message to the information processing unit 112.

The information processing unit 112 is further configured to find out whether or not there is a friend corresponding to the third friend identifier from the friend list included in the application corresponding to third application identifier, and if so, the sending message is converted into the information of a second preset format and transmitted to the instant messaging unit 111.

The instant messaging unit 111 is further configured to transmit the converted third message content and the converted third friend identifier to the instant messaging server corresponding to the converted third application identifier so that the instant messaging server may transmit the converted third message content to the friend corresponding to the converted third friend identifier. The instant messaging server is any one of the plurality of instant messaging servers.

In the present embodiment, when the user needs to transmit information through the wearable device, the user may firstly transmit the sending message including the third application identifier and the third friend identifier to the mobile terminal through the wearable device, and the mobile terminal finds out whether there is a friend corresponding to the third friend identifier in the friend list included in the application corresponding to the third application identifier, and if so, the mobile terminal may transmit the third message content and the third friend identifier to the instant messaging server corresponding to the third application identifier, so that the instant messaging server may transmit the converted third message content to the friend corresponding to the converted third friends identifier. Herein when the format of the sending message inputted by the wearable device is different from the second preset format corresponding to the instant messaging server corresponding to the third application identifier, before transmitting, the information processing unit included in the mobile terminal will firstly convert the sending message according to the second preset format.

In the present embodiment, if the friend list, included in the application corresponding to the third application identifier, does not include a friend corresponding to the third friend identifier, the mobile terminal transmits a prompt message to the wearable device to inform that there is no friend corresponding to the third friend identifier, so that the user may stop transmitting information to the friend corresponding to the third friend identifier, and may add a friend corresponding to the friend identifier into the application corresponding to the third application identifier, or reenter a correct third friend identifier.

In the present embodiment, when the communication system includes the communication module 13, the instant messaging unit 111 transmits the converted third message content and the converted third friend identifier to the instant messaging server corresponding to the converted third application identifier, so that the instant messaging server transmits the converted third message content to the friend corresponding to the converted third friend identifier, in the following detailed way. The instant messaging unit 111 transmits the converted third message content and the converted third friend identifier to the instant messaging server corresponding to the third application identifier via the communication module 13, so that the instant messaging server transmits the converted third message content to the friend corresponding to the converted third friend identifier, and the communication module 13 is further configured to receive the converted sending message from the instant messaging unit 111 and transmit the converted third message content and the converted third friend identifier to the instant messaging server corresponding to the converted third application identifier.

In the present embodiment, the user may input the sending message into the wearable device by voice, text, or the like. When the input mode is a voice mode, the input module is a voice input module, such as a microphone, or the like; when the input mode is a text mode, the input module is a text input module, such as a display screen, a button and so on.

In the present embodiment, the user can transmit the message content, the friend identifier and the application identifier to be transmitted to the mobile terminal by one trial through the wearable device, or the friend identifier and the application identifier may be firstly transmitted to the mobile terminal through the wearable device, and as the mobile terminal returns the confirmation information, then the message content is transmitted to the mobile terminal through the wearable device. The user may select to choose a specific transmission way according to the need through the mobile terminal.

As a possible embodiment, the information processing unit 112 transmits the receiving message to the first communication module 12 in the following manner.

The receiving message is converted into the information of the third preset format and transmitted to the first communication module 12.

In the present embodiment, when the format of the receiving message transmitted from the target instant messaging server is different from the format of the information that is able to be outputted by the wearable device, the information processing unit converts the format of the receiving message to the information of the third preset format that the wearing device can recognize and output after receiving the receiving message, so that the wearable device can recognize and output the receiving message. Herein, the wearing device may output the receiving message in a voice mode through a microphone, a speaker or the like, the receiving message may also be output by a display screen through the text, animation, video, etc., or it may also be output through the combination of voice and display screen, and the present embodiment is not limited to those ways.

In the present embodiment, after the wearable device is started, it is also necessary to establish a wireless connection between the mobile terminal and the wearable device, which may be a connection request initiated by the mobile terminal to the wearable device, or may be a connection request transmitted from the wearable device to the mobile terminal. The present embodiment is not limited to these examples.

As a possible embodiment, during the initialization, the instant messaging unit 111 establishes a connection with a plurality of instant messaging servers specifically by way of: transmitting an authorization request to the target instant messaging server to trigger the target instant messaging server to transmit a security identifier to the instant messaging unit 111; receiving the security identifier transmitted from the target instant messaging server to trigger the target mobile terminal to obtain the security identifier and transmit the authorization information including the security identifier and the application account corresponding to the registered target instant messaging server on the target mobile terminal, so as to trigger the target instant messaging server authorizes the instant messaging unit 111 to log in by the application account and transmit a login completion information; wherein the target mobile terminal is a mobile terminal that has been authorized to conduct communication through the application account; and receiving the login completion information transmitted from the target instant messaging server.

In the present embodiment, during the initialization process, the instant messaging unit may transmit an authorization request to the target instant messaging server so that the target instant messaging server may return the security identifier to the instant messaging unit. Since the instant messaging unit has not yet been authorized, the instant messaging unit cannot log in. After the instant messaging unit has received the security identifier, the target mobile terminal, which has been authorized to communicate with the target instant messaging server through the application account, may obtain the security identifier through user inputting, transmitting the security identifier acquisition request to the instant messaging unit, the instant messaging unit's actively transmitting or by scanning the wearable device's screen which shows the security identifier, and then the target mobile terminal transmits the authorization information including the security identifier and the application account to the target instant messaging server. The authorization information indicates that the user corresponding to the application account has authorized the instant messaging unit to log in by using the application account. After receiving the authorization information, the target instant messaging server authorizes the instant messaging unit to log in through the application account, and transmits the login completion information to the instant messaging unit. When the instant messaging unit receives the login completion information, it is indicated that the initialization has been completed and the information may be transmitted.

In the communication system described in FIG. 2, the wearable device may only need to be capable of communicating with the mobile terminal wirelessly and receiving information inputted by the user, and it is not necessary to have a communication capability of 2G or more. Therefore, it realizes an instant messaging and at the same time reduces the size, the hardware requirements and the cost of wearable device, and extends the standby time of wearable device.

Figure 3:
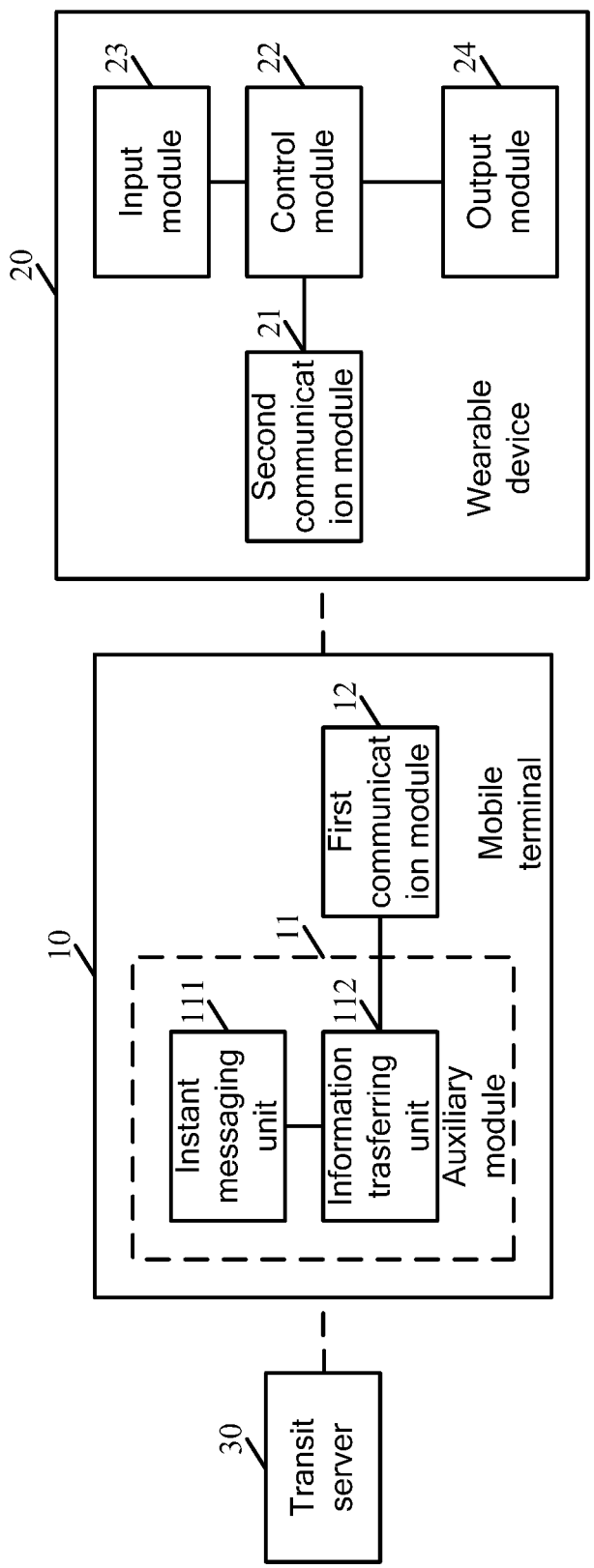
FIG. 3 is a block diagram of a communication system according to yet another embodiment of the present invention.

Referring FIG. 3, FIG. 3 is a block diagram of a communication system according to another embodiment of the present invention. As shown in FIG. 3, the communication system includes a mobile terminal 10 and a wearable device 20 which are connected to each other with a wireless connection. The mobile terminal 10 includes an auxiliary module 11 and a first communication module 12. The auxiliary module 11 includes an instant messaging unit 111 and an information processing unit 112. The information processing unit 112 is respectively connected to the instant messaging unit 111 and the first communication module 12. The wearable device 20 includes a second communication module 21, a control module 22, an input module 23, and an output module 24. The second communication module 21, the input module 23, and the output module 24 are connected to the control module 22, respectively.

The instant messaging unit 111 is configured to establish a connection with a plurality of instant messaging servers during the initialization process.

The instant messaging unit 111 is further configured to receive the instant message transmitted from the target instant messaging server, obtain the first application identifier corresponding to the target instant messaging server according to the type of the target instant messaging server, generate the receiving message according to the instant message and the first application identifier, and transmit the receiving message to the information processing unit 112. The instant message includes a first message content and a first friend identifier. The receiving message includes the first message content, the first application identifier and the first friend identifier. The target instant messaging server may be any one of the plurality of the instant messaging servers.

The information processing unit 112 is configured to transmit the receiving message to the first communication module 12.

The first communication module 12 is configured to transmit the receiving message to the second communication module 21.

The second communication module 21 is configured to transmit the receiving message to the control module 22.

The control module 22 is configured to transmit the receiving message to the output module 24.

The output module 24 is configured to output the receiving message.

In the present embodiment, the mobile terminal 10 is connected to the wearable device 20 via a wireless connection such as a Bluetooth connection, a Wi-Fi connection, a ZigBee connection, a radio frequency identification, i.e. RFID connection, a modulation wireless transmission connection, an infrared connection, or the like. The mobile terminal 10 has a mobile communication capability, so as to transmit information to a server wirelessly. The mobile terminal may be a mobile phone, a tablet, a notebook computer, a desktop computer, or the like.

In the present embodiment, when the communication system is initialized, the instant messaging unit will establish a connection with a plurality of instant messaging servers. After the communication system is initialized, when the target instant messaging server receives the instant message to be transmitted to the mobile terminal, the target instant messaging server transmits the instant message to the instant messaging unit included in the mobile terminal, and the instant messaging obtains first application identifier corresponding to the target instant messaging server according to the type of the target instant messaging server, generates the receiving message based on the instant message and the first application identifier, and then transmits the receiving message to the information processing unit. The information processing unit transmits the receiving message to the first communication module, and the first communication module transmits the receiving message to the second communication module included in the wearable device, the second communication module transmits the receiving message to the control module, the control module transmits the receiving message to the output module, and the output module outputs the receiving message. Herein the instant message includes a first message content and a first friend identifier. The receiving message includes a first message content, a first application identifier and a first friend identifier. The target instant messaging server is any one of the plurality of instant messaging servers. The application corresponding to the first application identifier may be QQ, WeChat, MOMO, easyChat, Laiwang, Tantan or other instant messaging applications, and may be any one of those instant messaging applications. A friend corresponding to the first friend identifier may be a friend in a friend list included in the application corresponding to the first application identifier, or may not the one in the friend list included in the application corresponding to the first application identifier, such as unfamiliar friends, friends obtained from nearby search and so on.

As a possible embodiment, the mobile terminal also includes a transit server 30.

During the initialization process, the instant messaging unit 111 establishes a connection with the plurality of instant messaging servers in a specific manner as follows.

During the initialization process, the instant messaging unit 111 establishes a connection with the plurality of instant messaging servers through the transit server 30.

The transit server 30 is configured to establish a connection with the plurality of instant messaging servers during the initialization process.

The transit server 30 is further configured to receive the receiving message transmitted from the target instant messaging server and transmit it to the instant messaging unit 111.

The instant messaging unit 111 receives the receiving message transmitted from the target instant messaging server in the following manner.

The instant messaging unit 111 receives the receiving message transmitted from the target instant messaging server through the transit server 30.

In the present embodiment, during the communication system's initialization process, when the instant messaging server provides an interface for communicating with the instant messaging unit, the instant messaging unit may establish a connection directly with the plurality of instant messaging servers; when the instant messaging server does not provide any interface for communicating with the instant messaging unit, the instant messaging unit can establish a connection with a plurality of instant messaging servers through the transit server so that the instant messaging unit can exchange information with the plurality of instant messaging servers through the transit server.

As a possible embodiment, the information processing unit 112 is further configured to, after receiving the receiving message, transmit a prompt message to the first communication module 12 for indicating whether the receiving message is received or not.

The first communication module 12 is further configured to transmit the prompt message to the second communication module 21.

The second communication module 21 is further configured to transmit the prompt message to the control module 22.

The control module 22 is further configured to transmit the prompt message to the output module 24.

The output module 24 is further configured to output the prompt message.

The input module 23 is configured to receive a confirmation instruction inputted by a user according to the prompt message, and transmit the confirmation instruction to the control module 22.

The control module 22 is further configured to transmit the confirmation instruction to the second communication module 21.

The second communication module 21 is further configured to transmit the confirmation instruction to the first communication module 12.

The first communication module 12 is further configured to transmit the confirmation instruction to the information processing unit 112.

The information processing unit 112 is further configured to execute a step of transmitting the receiving message to the first communication module 12, in response to the confirmation instruction.

In the present embodiment, after the mobile terminal receives the receiving message, the first message content, the first application identifier and the first friend identifier included in the receiving message may be transmitted to the wearable device by one trial, and the user may be reminded by the wearable device of receiving message. When a read instruction that the user input to read the receiving message has been received, the receiving message will be outputted. It is also possible to firstly transmit a prompt message to the wearable device for indicating whether to receive the receiving message or not. prompt message The prompt message is output to user through the wearable device. When the confirmation instruction inputted by the user has been received, the confirmation instruction will be transmitted to the mobile terminal, the mobile terminal then transmits the receiving message to the wearable device, and the wearable device outputs the receiving message. Herein, the way of reminding the user can be vibration, voice, display lightening, LED lights flashing and combinations thereof. The receiving message and prompt message can be outputted by the way of voice, text, animation, video and so on. Herein the first friend identifier is the identifier of the user who transmitted the receiving message.

As a possible embodiment, the input module 23 is configured to receive query information the user inputs, and transmit it to the control module 22. The query information includes a second application identifier and a second friend identifier.

The control module 22 is further configured to transmit the query information to the second communication module 21.

The second communication module 21 is further configured to transmit the query information to the first communication module 12.

The first communication module 12 is further configured to transmit the query information to the information processing unit 112.

The information processing unit 112 is further configured to find out whether or not there is a friend corresponding to the second friend identifier from the friend list included in the application corresponding to the second application identifier, and if so, the information processing unit 112 transmits the confirmation information to the first communication module 12 to confirm that there is a friend corresponding to the second friend identifier.

The first communication module 12 is further configured to transmit the confirmation information to the second communication module 21.

The second communication module 21 is further configured to transmit the confirmation information to the control module 22.

The control module 22 is further configured to transmit the confirmation information to the output module 24.

The output module 24 is further configured to output the confirmation information to user.

The input module 23 is further configured to receive the second message content inputted by the user and transmit it to the control module 22.

The control module 22 is further configured to transmit the second message content to the second communication module 21.

The second communication module 21 is further configured to transmit the second message content to the first communication module 12.

The first communication module 12 is further configured to transmit the second message content to the information processing unit 112.

The information processing unit 112 is configured to convert the second message content, the second application identifier and the second friend identifier according to a first preset format and transmit them to the instant messaging unit 111.

The instant messaging unit 111 is further configured to transmit the converted second message content and the converted second friend identifier to the instant messaging server corresponding to the converted second application identifier so that the instant messaging server may transmit the converted second message content to the friend corresponding to the converted second friend identifier. The instant messaging server is any one of the plurality of instant messaging servers.

In the present embodiment, the communication system may not only transmit the receiving message received by the mobile terminal from the instant messaging server, to the wearable device, in which case the user can be informed by the wearable device of receiving the information, so that the user can receive the information through the wearable device, but also may transmit the information that the user needs to transmit, to the mobile terminal by the wearable device, and the mobile terminal transmits the information to the corresponding instant messaging server.

In the present embodiment, when the user needs to transmit information through the wearable device, the user may firstly transmit an inquiry information including the second application identifier and the second friend identifier to the mobile terminal through the wearable device, and the mobile terminal finds out whether there is a friend corresponding to the second friend identifier in the friend list included in the application corresponding to the second application identifier, and if so, a confirmation information that there is a friend corresponding to the second friend identifier may be transmitted to the wearable device, so that the user may transmit the second message content to the mobile terminal by the wearable device, and the mobile terminal transmits the second message content and the second friend identifier to the instant messaging server corresponding to the second application identifier, and thus the instant messaging server may transmit the converted second message content to the fiend corresponding to the converted second friends identifier. Herein when the format of the second message content, the second application identifier, and the second friend identifier entered by the wearable device is different from the first preset format corresponding to the instant messaging server corresponding to the second application identifier, before transmitting, the information processing unit included in the mobile terminal will firstly convert the second message content, the second application identifier, and the second friend identifier according to the first preset format.

In the present embodiment, if the friend list, included in the application corresponding to the second application identifier, does not include a friend corresponding to the second friend identifier, the mobile terminal transmits a prompt message to the wearable device to inform that there is no friend corresponding to the second friend identifier, so that the user may stop transmitting information to the friend corresponding to the second friend identifier, and may add a friend corresponding to the friend identifier into the application corresponding to the second application identifier, or reenter a correct second friend identifier.

In the present embodiment, when the communication system includes the transit server 30, the instant messaging unit 111 transmits the converted second message content and the converted second friend identifier to the instant messaging server corresponding to the converted second application identifier, so that the instant messaging server transmits the converted second message content to the friend corresponding to the converted second friend identifier, in the following detailed way. The instant messaging unit 111 transmits the converted second message content and the converted second friend identifier to the instant messaging server corresponding to the second application identifier via the transit server 30, so that the instant messaging server transmits the converted second message content to the friend corresponding to the converted second friend identifier, and the transit server 30 is also configured to receive the converted second message content from the instant messaging unit 111 and transmit the converted second message content and the converted second friend identifier to the instant messaging server corresponding to the converted second application identifier.

As a possible embodiment, the input module 23 is configured to receive the sending message inputted by the user and transmit the sending message to the control module 22. The sending message includes a third message content, a third application identifier, and a third friend identifier.

The control module 22 is further configured to transmit the sending message to the second communication module 21.

The second communication module 21 is further configured to transmit the sending message to the first communication module 12.

The first communication module 12 is further configured to transmit the sending message to the information processing unit 112, The information processing unit 112 is further configured to find out whether or not there is a friend corresponding to the third friend identifier from the friend list included in the application corresponding to third application identifier, and if so, the sending message is converted into the information of a second preset format and transmitted to the instant messaging unit 111.

The instant messaging unit 111 is further configured to transmit the converted third message content and the converted third friend identifier to the instant messaging server corresponding to the converted third application identifier so that the instant messaging server may transmit the converted third message content to the friend corresponding to the converted third friend identifier. The instant messaging server is any one of the plurality of instant messaging servers.

In the present embodiment, when the user needs to transmit information through the wearable device, the user may firstly transmit the sending message including the third application identifier and the third friend identifier to the mobile terminal through the wearable device, and the mobile terminal finds out whether there is a friend corresponding to the third friend identifier in the friend list included in the application corresponding to the third application identifier, and if so, the mobile terminal may transmit the third message content and the third friend identifier to the instant messaging server corresponding to the third application identifier, so that the instant messaging server may transmit the converted third message content to the fiend corresponding to the converted third friends identifier. Herein when the format of the sending message inputted by the wearable device is different from the second preset format corresponding to the instant messaging server corresponding to the third application identifier, before transmitting, the information processing unit included in the mobile terminal will firstly convert the sending message according to the second preset format.

In the present embodiment, if the friend list, included in the application corresponding to the third application identifier, does not include a friend corresponding to the third friend identifier, the mobile terminal transmits a prompt message to the wearable device to inform that there is no friend corresponding to the third friend identifier, so that the user may stop transmitting information to the friend corresponding to the third friend identifier, and may add a friend corresponding to the friend identifier into the application corresponding to the third application identifier, or reenter a correct third friend identifier.

In the present embodiment, when the communication system includes the transit server 30, the instant messaging unit 111 transmits the converted third message content and the converted third friend identifier to the instant messaging server corresponding to the converted third application identifier, so that the instant messaging server transmits the converted third message content to the friend corresponding to the converted third friend identifier, in the following detailed way. The instant messaging unit 111 transmits the converted third message content and the converted third friend identifier to the instant messaging server corresponding to the third application identifier via the transit server 30, so that the instant messaging server transmits the converted third message content to the friend corresponding to the converted third friend identifier, and the transit server 30 is further configured to receive the converted sending message from the instant messaging unit 111 and transmit the converted third message content and the converted third friend identifier to the instant messaging server corresponding to the converted third application identifier.

In the present embodiment, the user may input the sending message into the wearable device by voice, text, or the like. When the input mode is a voice mode, the input module is a voice input module, such as a microphone, or the like; when the input mode is a text mode, the input module is a text input module, such as a display screen, a button and so on.

In the present embodiment, the user can transmit the message content, the friend identifier and the application identifier to be transmitted to the mobile terminal by one trial through the wearable device, or the friend identifier and the application identifier may be firstly transmitted to the mobile terminal through the wearable device, and as the mobile terminal returns the confirmation information, then the message content is transmitted to the mobile terminal through the wearable device. The user may select to choose a specific transmission way according to the need through the mobile terminal.

As a possible embodiment, the information processing unit 112 transmits the receiving message to the first communication module 12 in the following manner.

The receiving message is converted into the information of the third preset format and transmitted to the first communication module 12.

In the present embodiment, when the format of the receiving message transmitted from the target instant messaging server is different from the format of the information that is able to be outputted by the wearable device, the information processing unit converts the format of the receiving message to the third preset format that the wearing device can recognize and output after receiving the receiving message, so that the wearable device can recognize and output the receiving message. Herein, the wearing device may output the receiving message in a voice mode through a microphone, a speaker or the like, the receiving message may also be output by a display screen through the text, animation, video, etc., or it may also be output through the combination of voice and display screen, and the present embodiment is not limited to those ways In the present embodiment, after the wearable device is started, it is also necessary to establish a wireless connection between the mobile terminal and the wearable device, which may be a connection request initiated by the mobile terminal to the wearable device, or may be a connection request transmitted from the wearable device to the mobile terminal. The present embodiment is not limited to these examples.

As a possible embodiment, during the initialization, the instant messaging unit 111 establishes a connection with a plurality of instant messaging servers specifically by way of: transmitting an authorization request to the target instant messaging server to trigger the target instant messaging server to transmit a security identifier to the instant messaging unit 111; receiving the security identifier transmitted from the target instant messaging server to trigger the target mobile terminal to obtain the security identifier and transmit the authorization information including the security identifier and the application account logged-in the target mobile terminal corresponding to the target instant messaging server, so as to trigger the target instant messaging server authorizes the instant messaging unit 111 to log in via the application account and transmit a login completion information; wherein the target mobile terminal is a mobile terminal that has been authorized to conduct communication through the application account; and receiving the login completion information transmitted from the target instant messaging server.

In the present embodiment, during the initialization process, the instant messaging unit may transmit an authorization request to the target instant messaging server so that the target instant messaging server may return the security identifier to the instant messaging unit. Since the instant messaging unit has not yet been authorized, the instant messaging unit cannot log in. After the instant messaging unit has received the security identifier, the target mobile terminal, which has been authorized to communicate with the target instant messaging server through the application account, may obtain the security identifier through user inputting, through transmitting the security identifier acquisition request to the instant messaging unit, through the instant messaging unit's actively transmitting or through scanning the wearable device's screen which shows the security identifier, and then the target mobile terminal transmits the authorization information including the security identifier and the application account to the target instant messaging server. The authorization information indicates that the user corresponding to the application account has authorized the instant messaging unit to log in by using the application account. After receiving the authorization information, the target instant messaging server authorizes the instant messaging unit to log in through the application account, and transmits the login completion information to the instant messaging unit. When the instant messaging unit receives the login completion information, it is indicated that the initialization has completed and the information may get transmitted.

In the communication system described in FIG. 3, the wearable device may only need to be capable of communicating with the mobile terminal wirelessly and receiving information inputted by the user, and it is not necessary to have a communication capability of 2G or more. Therefore, it realizes an instant messaging and at the same time reduces the size, the hardware requirements and the cost of wearable device, and extends the standby time of wearable device.

The foregoing disclosure is a detailed description of the communication system according to the embodiments of the present invention. The principles and implementations of the present invention have been described with reference to specific examples. The description of the above embodiments is merely for the purpose of understanding the method core spirit of the present invention. Meanwhile, based on the spirit of the present invention, many modifications may be made to the embodiments and application scope by one with ordinary skills in the art. Above all, the present specification shall not be intended to limit the present invention.

We claim:

1. A communication system, comprising a mobile terminal and a wearable device wirelessly connected to each other;

wherein the mobile terminal comprises:

a first communication module; and an auxiliary module comprising an instant messaging unit and an information processing unit connected with the instant messaging unit and the first communication module respectively;

and wherein the wearable device comprises:

a second communication module;

an input module;

an output module; and a control module respectively connected with the second communication module, the input module and the output module;

and wherein the instant messaging unit is configured to establish a connection with a plurality of instant messaging servers during initialization;

the instant messaging unit is further configured to receive an instant message provided by a target instant messaging server, obtain a first application identifier corresponding to the target instant messaging server according to types of the target instant messaging server, generate a receiving message according to the instant message and the first application identifier, and transmit the receiving message to the information processing unit; the instant message comprises a first message content and a first friend identifier; the receiving message comprises the first message content, the first application identifier and the first friend identifier; the target instant messaging server is any one of the plurality of instant messaging servers;

the information processing unit is configured to transmit the receiving message to the first communication module;

the first communication module is configured to transmit the receiving message to the second communication module;

the second communication module is configured to transmit the receiving message to the control module;

the control module is configured to transmit the receiving message to the output module; and the output module is configured to output the receiving message;

when a user needs to send a message associated with a second message content, a second application identifier, and a second friend identifier from the wearable device to an instant messaging server corresponding to the second application identifier via the mobile terminal, the wearable device is configured to receive a query information inputted by the user and transmit the query information to the mobile terminal, wherein the query information includes the second application identifier and the second friend identifier and/or the second message content inputted by the user;

the mobile terminal is configured to find out whether there is a friend corresponding to the second friend identifier from a friend list including in the application corresponding to the second application identifier, and if so, the mobile terminal is further configured to transmit a confirmation information to the wearable device to confirm that there is a friend corresponding to the second friend identifier;

if the transmitted query information includes the second application identifier and the second friend identifier, when the wearable device receives the confirmation information, the wearable device is configured to transmit the second message content inputted by the user to the mobile terminal; and the mobile terminal is further configured to transmit the second message content and the second friend identifier to the instant messaging server, wherein the instant messaging server is configured to transmit the second message content to a friend corresponding to the second friend identifier;

if the transmitted query information includes the second application identifier, the second friend identifier, and the second message content inputted by the user, the mobile terminal is further configured to transmit the second message content and the second friend identifier to the instant messaging server, wherein the instant messaging server is configured to transmit the second message content to a friend corresponding to the second friend identifier.

2. The system according to claim 1, wherein the information processing unit is further configured to transmit a prompt message to the first communication module for indicating whether to receive the receiving message or not, after receiving the receiving message;

the first communication module is further configured to transmit the prompt message to the second communication module;

the second communication module is further configured to transmit the prompt message to the control module;

the control module is further configured to transmit the prompt message to the output module;

the output module is further configured to output the prompt message;

the input module is further configured to receive a confirmation instruction inputted by a user according to the prompt message, and transmit the confirmation instruction to the control module;

the control module is further configured to transmit the confirmation instruction to the second communication module;

the second communication module is further configured to transmit the confirmation instruction to the first communication module;

the first communication module is further configured to transmit the confirmation instruction to the information processing unit;

and the information processing unit is further configured to execute a step of transmitting the receiving message to the first communication module, in response to the confirmation instruction.

3. The system according to claim 1, wherein, the input module of the wearable device is configured to receive the query information inputted by the user and transmit the query information to the control module;

the control module of the wearable device is further configured to transmit the query information to the second communication module of the wearable device;

the second communication module of the wearable device is further configured to transmit the query information to the first communication module of the mobile terminal;

the first communication module of the mobile terminal is further configured to transmit the query information to the information processing unit of the mobile terminal;

the information processing unit of the mobile terminal is further configured to find out whether there is the friend corresponding to the second friend identifier from the friend list included in the application corresponding to the second application identifier, and if so, the information processing unit of the mobile terminal transmits the confirmation information to the first communication module of the wearable device to confirm that there is the friend corresponding to the second friend identifier;

the first communication module of the mobile terminal is further configured to transmit the confirmation information to the second communication module of the wearable device;

the second communication module of the wearable device is further configured to transmit the confirmation information to the control module of the wearable device;

the control module of the wearable device is further configured to transmit the confirmation information to the output module of the wearable device;

the output module of the wearable device is further configured to output the confirmation information;

the input module of the wearable device is further configured to receive the second message content inputted by the user and transmit the second message content to the control module of the wearable device;

the control module of the wearable device is further configured to transmit the second message content to the second communication module of the wearable device;

the second communication module of the wearable device is further configured to transmit the second message content to the first communication module of the mobile terminal;

the first communication module of the mobile terminal is further configured to transmit the second message content to the information processing unit of the mobile terminal;

the information processing unit of the mobile terminal is further configured to convert the second message content, the second application identifier, and the second friend identifier according to a first preset format and transmit to the instant messaging unit;

the instant messaging unit of the mobile terminal is further configured to transmit the converted second message content and the converted second friend identifier to the instant messaging server corresponding to the converted second application identifier so that the instant messaging server transmits the converted second message content to the friend corresponding to the converted second friend identifier; and the instant messaging server is any one of the plurality of instant messaging servers.

4. The system according to claim 1, wherein the input module is configured to receive a sending message inputted by a user and transmit the sending message to the control module; the sending message includes a third message content, a third application identifier, and a third friend identifier;

the control module is further configured to transmit the sending message to the second communication module;

the second communication module is further configured to transmit the sending message to the first communication module;

the first communication module is further configured to transmit the sending message to the information processing unit;

the information processing unit is further configured to find out whether or not there is a friend corresponding to the third friend identifier from a friend list included in the application corresponding to third application identifier, and if so, the sending message is converted according to a second preset format and transmitted to the instant messaging unit;

the instant messaging unit is further configured to transmit the converted third message content and the converted third friend identifier to the instant messaging server corresponding to the converted third application identifier so that the instant messaging server may transmit the converted third message content to the friend corresponding to the converted third friend identifier; and the instant messaging server is any one of the plurality of instant messaging servers.

5. The system according to claim 1, wherein the information processing unit transmits the receiving message to the first communication module by way of:

converting the receiving message according to a third preset format and then transmitting the converted receiving message to the first communication module.

6. The system according to claim 1, wherein the mobile terminal further includes an instant messaging module connected to the instant messaging unit;

the instant messaging unit, during initialization, establishes a connection with a plurality of instant messaging servers in such a manner that:

the instant messaging unit establishes a connection with the plurality of instant messaging servers through the instant messaging module when the instant messaging unit is initialized;

the instant messaging module is configured to establish a connection with the plurality of instant messaging servers during initialization; and the instant messaging module is further configured to receive the receiving message provided by the target instant messaging server and transmit the receiving message to the instant messaging unit;

and the instant messaging unit receives the receiving message transmitted from the target instant messaging server in such a manner that:

the instant messaging unit receives the receiving message provided by the target instant messaging server through the instant messaging module.

7. The system according to claim 1, wherein the system further includes a transit server;

the instant messaging unit, during initialization, establishes a connection with a plurality of instant messaging servers in such a manner that:

the instant messaging unit establishes a connection with the plurality of instant messaging servers through the transit server during initialization;

the transit server is configured to establish a connection with the plurality of instant messaging servers during initialization; and the transit server is further configured to receive the receiving message provided by the target instant messaging server and transmit the receiving message to the instant messaging unit;

and the instant messaging unit receives the receiving message transmitted from the target instant messaging server in such a manner that:

the instant messaging unit receives the receiving message provided by the target instant messaging server through the transit server.

8. The system according to claim 1, wherein the instant messaging unit, during initialization, establishes a connection with a plurality of instant messaging servers by way of:

transmitting an authorization request to the target instant messaging server to trigger the target instant messaging server to transmit a security identifier to the instant messaging unit;

receiving a security identifier transmitted from the target instant messaging server to trigger the target mobile terminal to obtain the security identifier and transmit an authorization information including the security identifier and the application account logged in the target mobile terminal corresponding to the target instant messaging server, so as to trigger the target instant messaging server authorizes the instant messaging unit to log in via the application account; the target mobile terminal is a mobile terminal that has been authorized to conduct communication through the application account;

and receiving a registration completion information transmitted from the target instant messaging server.

* * * * *